United States Patent [19]
Trefethan et al.

[11] Patent Number: 5,960,405
[45] Date of Patent: *Sep. 28, 1999

[54] WORLDWIDE MARKETING LOGISTICS NETWORK INCLUDING STRATEGICALLY LOCATED CENTERS FOR FREQUENCY PROGRAMMING CRYSTAL OSCILLATORS TO CUSTOMER SPECIFICATION

[75] Inventors: Eugene S. Trefethan, Fort Myers, Fla.; John W. Fallisgaard, Seattle, Wash.

[73] Assignee: Fox Enterprises, Inc., Fort Myers, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/795,980

[22] Filed: Feb. 5, 1997

[51] Int. Cl.$^6$ ........................................ G06F 17/60
[52] U.S. Cl. .................... 705/9; 705/6; 705/8; 705/10; 705/9; 364/468.01; 364/468.15; 364/468.22; 364/468.24
[58] Field of Search .................. 705/8–9, 10, 6; 331/116 R, 158, 25, 176, 116 FE, 108 D, 16, 177 V, 179, 49, 10, 108 C, 18, 109, 177 R, 183, 4, 41, 44; 324/727, 76.41, 76.47, 76.52, 76.55; 327/141; 364/468.01, 468.15, 468.22, 468.24

[56] References Cited

U.S. PATENT DOCUMENTS

| | | | |
|---|---|---|---|
| 4,320,357 | 3/1982 | Wulfsberg et al. | 331/16 |
| 4,343,219 | 8/1982 | Uetrecht | 84/672 |

(List continued on next page.)

FOREIGN PATENT DOCUMENTS

| | | |
|---|---|---|
| 0 053 561 A2 | 6/1982 | European Pat. Off. |
| 0 203 756 | 12/1986 | European Pat. Off. |
| 0 437 634 A1 | 7/1991 | European Pat. Off. |
| 0 637 876 | 2/1995 | European Pat. Off. |
| 2-291161 | 11/1990 | Japan ............................. H01L 27/04 |
| 3-297223 | 12/1991 | Japan ............................. H03L 7/183 |
| 2 282 500 | 4/1995 | United Kingdom . |

OTHER PUBLICATIONS

IC Designs, "Satellite Oscillator," Model No. ICD2031A, May 1991.
IC Designs, "Programmable Clock Oscillator," Model No. ICD2053A.
IC Designs, "Frequency Multiplier," Model No. ICD2032, May 1991.
"ICD6233 Characterization Data," 1994.
IC Designs, "Dual Programmable Clock Oscillator," Model No. ICD2051, May 1991.

(List continued on next page.)

*Primary Examiner*—James P. Trammell
*Assistant Examiner*—Cuong H. Nguyen
*Attorney, Agent, or Firm*—Finnegan, Henderson, Farabow, Garrett & Dunner L.L.P.

[57] ABSTRACT

A worldwide logistics network includes a processing center for receiving customer orders for crystal oscillators over communications links, processing the orders, and generating work orders that are selectively disseminated over communications links to programming centers at strategic locations around the world. Each of the programming centers carries an inventory of generic programmable crystal oscillators. Upon receipt of a work order, a programming center withdraws quantity of programmable crystal oscillators from inventory sufficient to fill the customer order, and, using automated parts handling equipment, the oscillators are successively directed to an interface position with a computer. There, the unique crystal frequency of each oscillator is read and each oscillator is uniquely programmed on the basis of its crystal frequency to generate an output frequency meeting customer specification. Upon completion of this final manufacturing step, the programmed crystal oscillators are shipped to the customers directly from the programming centers.

46 Claims, 6 Drawing Sheets

U.S. PATENT DOCUMENTS

| | | | |
|---|---|---|---|
| 4,459,566 | 7/1984 | Lane | 331/135 |
| 4,468,636 | 8/1984 | Monticelli | 331/113 R |
| 4,486,846 | 12/1984 | McCallister et al. | 364/607 |
| 4,590,941 | 5/1986 | Saulson et al. | 607/34 |
| 4,689,581 | 8/1987 | Talbot | 331/1 A |
| 4,835,491 | 5/1989 | Coster | 331/2 |
| 5,053,723 | 10/1991 | Schemmel | 331/41 |
| 5,063,358 | 11/1991 | Vale et al. | 331/60 |
| 5,142,247 | 8/1992 | Lada, Jr. et al. | 331/14 |
| 5,150,079 | 9/1992 | Williams et al. | 331/75 |
| 5,262,735 | 11/1993 | Hashimoto et al. | 331/45 |
| 5,302,920 | 4/1994 | Bitting | 331/45 |
| 5,349,544 | 9/1994 | Wright et al. | 364/600 |
| 5,451,912 | 9/1995 | Torode | 331/108 C |
| 5,457,433 | 10/1995 | Westwick | 326/26 |
| 5,465,076 | 11/1995 | Yamauchi et al. | 331/179 |
| 5,467,373 | 11/1995 | Ketterling | 375/327 |
| 5,563,554 | 10/1996 | Mizuno | 331/57 |
| 5,570,066 | 10/1996 | Eberhardt et al. | 331/34 |
| 5,579,231 | 11/1996 | Sudou et al. | 706/919 |

OTHER PUBLICATIONS

MF Electronics Corp., "Phase Locked VCXO 10 MHz to 32.768 MHz," 1994.

MF Electronics Corp., "20 to 200 MHz Programmable ECL," 1994.

M–Tron, "MV Series VCXO Oscillators," 1994.

M–Tron, "MV Series VCXO Oscillators," 1995.

Vectron Labs., "Sonet Clock Recovery Module SCRM–622," Nov. 94.

Wenzel Associates Inc., "Custom Oscillator Configurations."

Connor–Winfield Corp., "SM PECL PLL Frequency Multiplier," 1995.

Epson, "Programmable Multi–Output Crystal Oscillator MG–5010," Mar. 7, 1993.

M–Tron, "MT1135 Series Dual Baud Rate Generators," 1987.

Hybrids International, Ltd., "Voltage Controlled Crystal Oscillators," pp. VCX–1 to VCX–3, 1995.

National Semiconductor, "IMX2306/2316/2326 PLLatinum Low Power Frequency Synthesizer for RF Personal Communications," Jan. 1998.

Hybrids International, Ltd., "Frequency Products," Sep. 23, 1994.

MF Electronics Corp., "Voltage Controlled Oscillators 1 MHz to 175 MHz," 1994.

Hybrids International, Ltd., "Product Summary," Aug. 1993.

Hybrids International, Ltd., "Crystal Oscillators: Voltage Controlled," pp. VC–1 to VC–3, Mar. 1993.

Cypress Semiconductor Corporation, "One–Time Programmable Clock Oscillator ICD6233," Apr. 1995.

Fox Electronics, "F3000/HCMOS/TTL Tri–State Enable/Disable Oscillator," 1992.

Fox Electronics, "F6053A/Tri–State HCMOS Programmable Clock Oscillator," 1993.

Fox Electronics, "F6151/Tri–State Dual Programmable Clock Oscillator," 1993.

Fox Electronics, "Programmable Crystal Oscillators for R.F. Applications," 1993.

Fox Electronics, Frequency Control Products Catalog, 1995–1996.

W. Ooms, "Improved Frequency Synthesizer," *Motorola Technical Disclosure Bulletin*, vol. 6, No. 1, pp. 4–6, Oct. 1, 1986, Schaumbourg, Illinois, USA.

E. Mielke, "Programmierbarer 50–MHz–Muttertaktimpulsegenerator," *Radio Fernsehen Elektronik*, vol. 39, No. 9, pp. 560–563, Jan. 1, 1990, Berlin, Germany.

D. Soderquist, "Digitally programmed oscillator is suitable for µP control", *Electronic Design* 13, Jun. 21, 1997, pp. 103–104.

A. Foord, "Voltage controlled oscillator," *Radio and Electronics Constructor*, vol. 28, No. 10, pp. 590–595, May 1975.

T.G. Giles, "A universal frequency synthesizer IC," *Philips Telecommunication Review*, vol. 37, No. 3, Aug. 1979, pp. 177–181.

Cypress Semiconductor Marketing Brochure, Published Nov., 1993, pp. 5–7, a publication of Cypress Semiconductor, San Jose, California.

| LOGICAL ORDER OF REGISTERS | | | | | | P REGISTER | | | | | | | | | | | | | N REGISTER | | | | | Q REGISTER | | | | | | | | |
|---|---|---|---|---|---|---|---|---|---|---|---|---|---|---|---|---|---|---|---|---|---|---|---|---|---|---|---|---|---|---|---|---|
| GST | SEC | 3V | XTALPULL | | | | | | | | | | | | | | | | | | | | | | | | | | | | | |
| "1" | "1" | MS | V3 | X2 | X1 | X0 | P11 | P10 | P9 | P8 | P7 | P6 | P5 | P4 | P3 | P2 | P1 | P0 | N3 | N2 | N1 | N0 | Q8 | Q7 | Q6 | Q5 | Q4 | Q3 | Q2 | Q1 | Q0 |
| S25 | S9 | S31 | S24 | S0 | S32 | S29 | S24 | S23 | S22 | S21 | S20 | S19 | S18 | S17 | S16 | S15 | S14 | S29 | S12 | S11 | S10 | S13 | S8 | S7 | S6 | S5 | S4 | S3 | S2 | S1 | S30 |

MSB — 117 — LSB

WORLDWIDE MARKETING LOGISTICS NETWORK INCLUDING STRATEGICALLY LOCATED CENTERS FOR FREQUENCY PROGRAMMING CRYSTAL OSCILLATORS TO CUSTOMER SPECIFICATION

REFERENCE TO RELATED APPLICATION

This application is related to applicants' U.S. application Ser. No. 08/795,978, entitled "Programmable Crystal Oscillator", filed concurrently herewith. The disclosure of this application is incorporated herein by reference.

FIELD OF THE INVENTION

The present invention relates to crystal oscillators and more particularly to the marketing of crystal oscillators drawn from inventory on demand and frequency programmed to customer specification as the final production step in their manufacture.

BACKGROUND OF THE INVENTION

Oscillators are ubiquitous components utilized for timing purposes in virtually all forms of electronic hardware ranging from timepieces to computers. Unfortunately, timing frequencies of the oscillators vary widely depending upon application and the particular electronic hardware in which the oscillators are to be implemented.

The most popular type of oscillator is a crystal oscillator, and, consequently, they are in high demand. Unfortunately, crystals, the heart of every crystal oscillator, are difficult to manufacture and require a long leadtime. In this process as traditionally practiced, a crystal bar or ingot is grown from a seed crystal. The crystal bar is x-ray examined to determine the correct cut angle, mounted at that angle on glass in a cutting fixture, and then sliced into crystal wafers. The wafers are then x-ray examined to confirm the cut angle. Next, the wafers are gross lapped to an appropriate thickness and then divided to remove the crystal seed. The wafers then undergo a series of steps, including x-raying, waxing together, shaping, unwaxing, intermediate lapping, segmenting into individual crystal blanks, fine lapping, chemical etching, sorting, gross base plating and multiple final plating steps, all designed to condition the crystals to generate a source (resonant) frequency to customer specification. This process may take weeks. Moreover, it must be known early in the manufacturing process, e.g., prior to intermediate lapping, but in some cases prior to slicing the ingots into wafers, what source frequencies the crystal wafers must generate in the customer end product. Thus, customers typically cannot order custom crystal oscillators from a manufacturer's inventory, i.e., crystal oscillators generating custom frequencies rather than stocked standard frequencies. In the case of custom crystal oscillators, customer orders are typically placed before a manufacturer will begin manufacture. If the manufacturer has a backlog of customer orders, it is not uncommon that the leadtime for custom crystal oscillators from order placement to delivery is measured in months. To gain shorter leadtimes, customers will typically have to pay premium prices. It is also not uncommon that, after placing a long leadtime order with a manufacturer, the customer's frequency specification changes or even the need for the crystal oscillator disappears. If manufacture of the oscillators to fill the order has begun, the customer is typically subjected to cancellation charges, since crystal wafers and the associated integrated circuit may not be salable to future customers. Consequently, these components may eventually have to be reworked or simply scrapped.

SUMMARY OF THE INVENTION

It is accordingly an objective of the present invention to provide a wide area, e.g., worldwide, logistics network for marketing crystal oscillators that overcomes the disadvantages and drawbacks of traditional crystal oscillator marketing practices, most particularly in reducing leadtimes to days, as contrasted to weeks or months.

To achieve this objective in accordance with one aspect of the present invention, there is provided a method of manufacturing and distributing crystal oscillators in response to customer demand, comprising the steps of establishing a centralized order process center; establishing a plurality of oscillator programming centers at geographically diverse sites linked to the process center by a communications network; and manufacturing a supply of generic programmable oscillators at a production site. The generic programmable oscillators are then distributed amongst the programming centers to build up and maintain an inventory of generic programmable oscillators at each programming center site while customer oscillator orders are accepted at the order processing center for processing to identify specifications of each processed customer order. The customer specifications, including oscillator quantity and output frequency, and delivery date and destination, are communicated as work orders to selected programming centers based on capability to meet the customer order specifications. Each programming center, in response to receipt of a work order, performs the steps of withdrawing from inventory a quantity of generic programmable oscillators sufficient to satisfy the oscillator quantity specified in the received work order, programs each generic programmable oscillator to generate the output frequency specified by the received work order, and ships the programmed oscillators to the delivery destination specified by the received work order.

In accordance with another aspect of the present invention, there is provided a method of manufacturing crystal oscillators to diverse customer specifications, comprising the steps of producing a supply of programmable crystal oscillators that generate clock signals of randomly differing frequencies; maintaining an inventory of the programmable crystal oscillators; and withdrawing from the inventory a plurality of the programmable crystal oscillators sufficient to satisfy a quantity of crystal oscillators specified in a customer order. Each of the plurality of programmable crystal oscillators is powered up to read the frequency of a reference clock signal output by the programmable crystal oscillator and then uniquely programmed on the basis of the reference clock signal frequency reading to produce an output clock signal frequency specified by the customer order.

Additional features, advantages and objectives of the present invention will be set forth in the description that follows and in part will be apparent from the description, or may be learned by practice of the invention. The objectives and advantages of the present invention will be realized and obtained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and together with the description, serve to explain the principles of the invention.

DETAILED DESCRIPTION

Figures 1, 7:
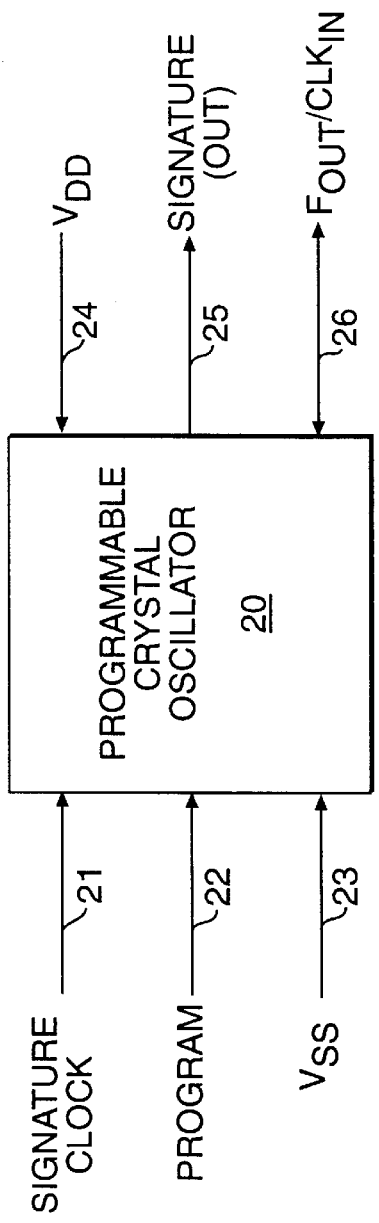
FIG. 1 is a plan view of a programmable crystal oscillator utilized in the present invention.
FIG. 7 illustrates a form of programming data word utilized in the programming method of claim 6; and Corresponding reference numerals refer to like parts throughout the several figures of the drawings.

An embodiment of a programmable crystal oscillator, utilized in the present invention, is illustrated in FIG. 1. This oscillator 20 may be produced in a variety of industry standard sizes and in two basic package configurations, pin through and surface mounted (SMD), depending upon the manner in which the oscillator is to be mounted in its particular application. The illustrated embodiment has six input/output (I/O) terminals, consisting of a Signature clock terminal 21, a dedicated Program input terminal 22, a ground (VSS) terminal 23, a supply voltage (VDD) terminal 24, a Signature output terminal 25, and a programmed frequency clock signal output ($F_{out}$)/programming clock pulse input ($CLK_{in}$) terminal 26. As will be described in detail below, programming data is entered via dedicated Program terminal 22 at a timing controlled by programming clock pulses ($CLK_{in}$) applied to terminal 26. When programmable crystal oscillator 20 is programmed by the programming data, it produces a clock signal output ($F_{out}$) on terminal 26 of a programmed frequency conforming to a customer specification anywhere within a wide range, e.g., 380 KHz to 175 MHz. In accordance with a feature of the present invention described below, oscillator 20 includes a programmable read only memory (PROM) 50, FIG. 2, into which customer data may be entered as programming data via Program terminal 22 under timing control imposed by clock pulses ($CLK_{in}$) applied to terminal 26 by the manufacturer at the time the oscillator is frequency programmed. Thereafter, the customer data may be read out on terminal 25 by applying clock or shift pulses to terminal 21. If this signature data feature is omitted, the crystal oscillator package configuration illustrated in FIG. 1 may be reduced to four terminals.

Figure 2:
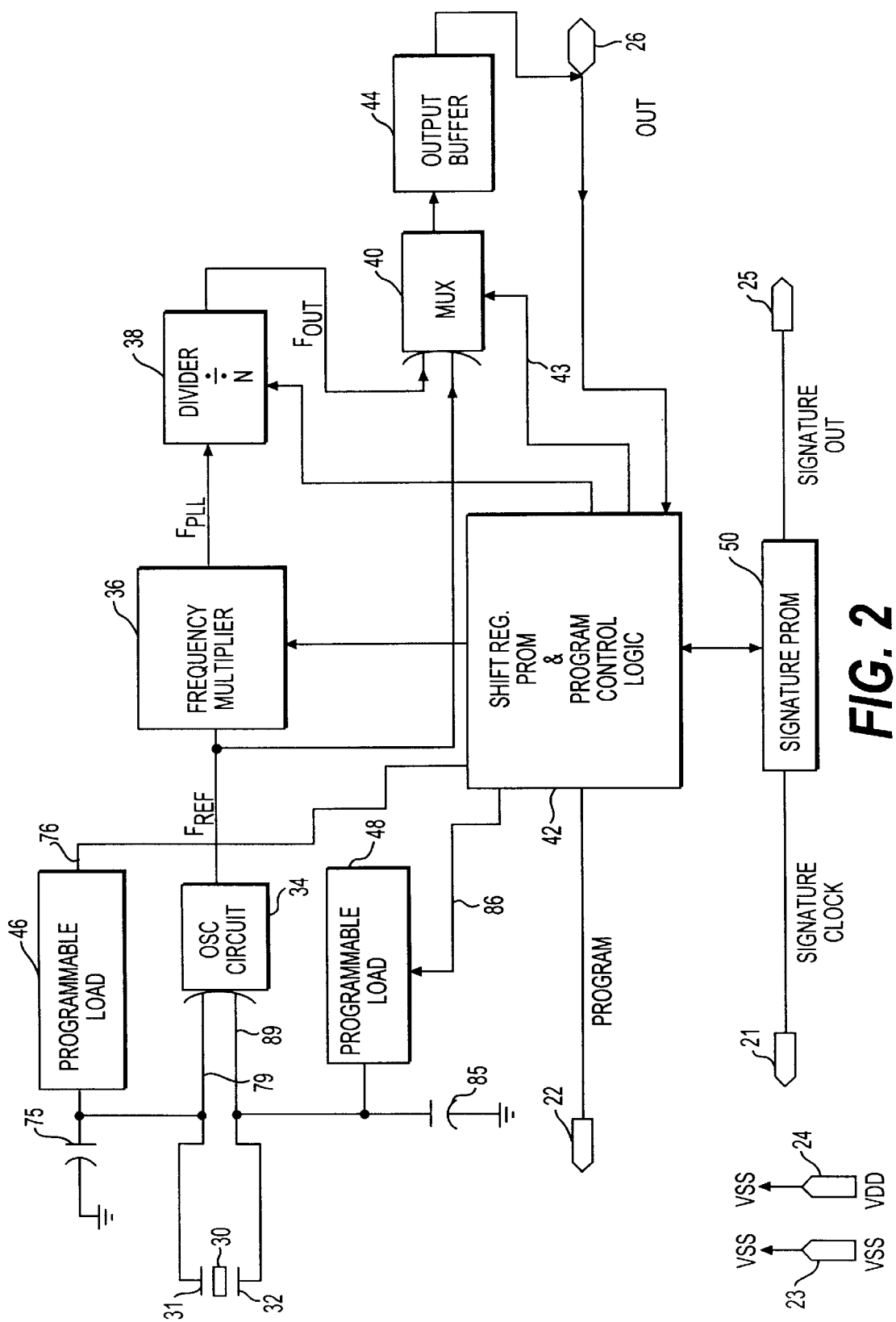
FIG. 2 is a block circuit diagram of the programmable crystal oscillator seen in FIG. 1.

Programmable crystal oscillator 20, illustrated in greater detail by the block diagram of FIG. 2, includes a crystal blank 30 electrically connected between pads 31 and 32 on an integrated circuit chip (not shown) for excitation by an oscillator circuit 34 and thus to generate a source (resonant) oscillating signal. This oscillator circuit includes an arrangement of resistor, capacitor, and inverter components well known in the crystal oscillator art and, thus, need not be described here. The frequency of the source oscillating signal, appearing at the output of oscillator circuit 34, is largely determined by the physical characteristics of the crystal blank 30.

In accordance with a feature of the present invention, programmable crystal oscillator 20 accommodates any crystal blank that oscillates within a wide range of source frequencies. That is, the source frequency may vary from crystal to crystal within a range without jeopardizing the capability of crystal oscillator 20 to be programmed to output clock signals at any frequency specified by a customer within a 380 KHz–175 MHz range, for example. In fact, the diverse crystal source frequencies need not be known in advance.

Figure 3:
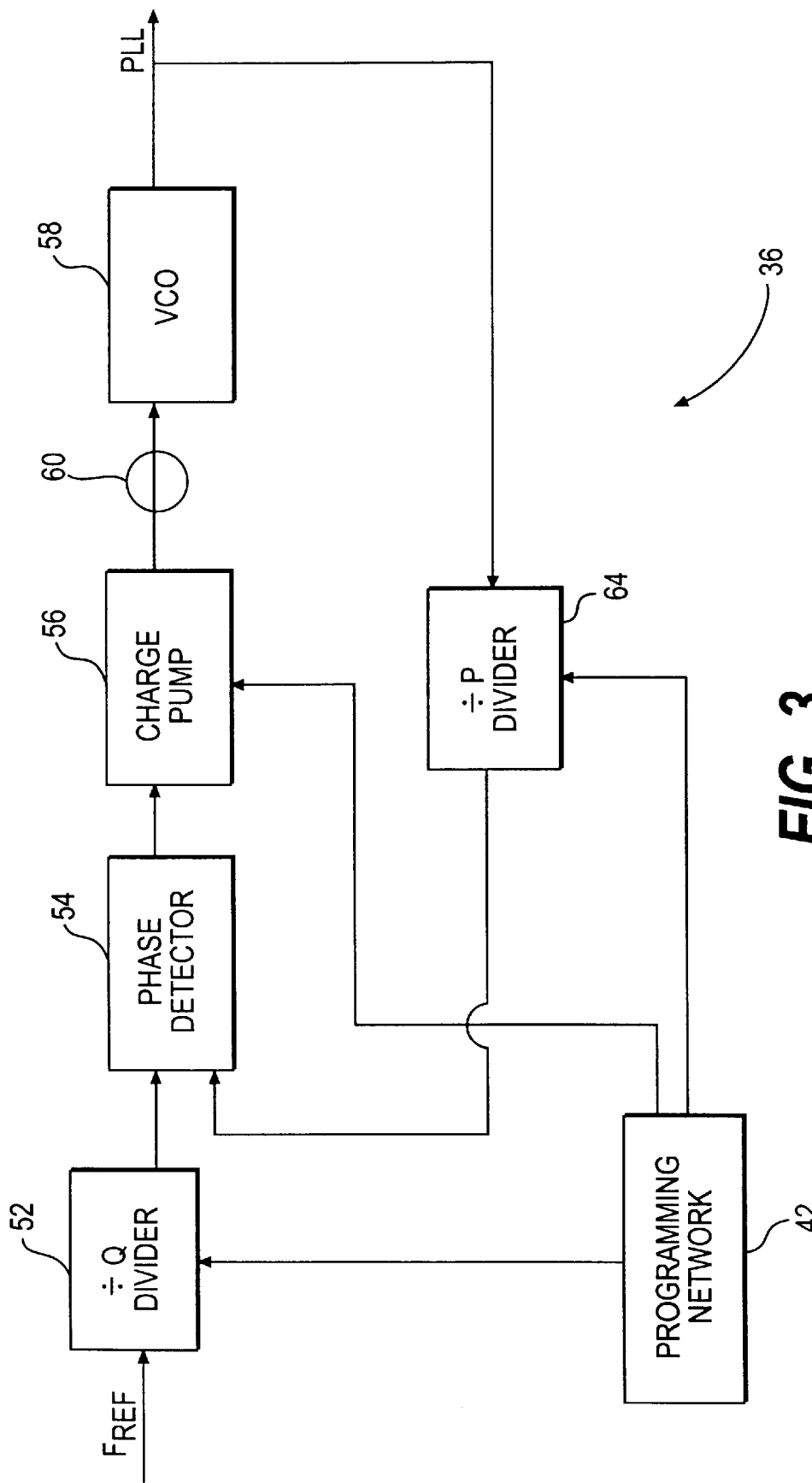
FIG. 3 is a block circuit diagram showing details of the frequency multiplier utilized in the programmable crystal oscillator of FIG. 2.

Still referring to FIG. 2, oscillator circuit 34 outputs clock signals at a reference frequency $F_{ref}$, equal to the crystal source frequency, which are applied to a frequency multiplier 36, illustrated in greater detail in FIG. 3. The frequency multiplier outputs clock signals at a frequency $F_{pll}$, to a frequency divider 38, which divides the frequency $F_{pll}$ by a programmable parameter N to produce clock signals $F_{out}$ of a programmed frequency conforming to customer specification. The $F_{out}$ and $F_{ref}$ clock signals are applied as separate inputs to a multiplexor 40. Under the control of program control logic in programming network 42 imposed over line 43, multiplexor 40 outputs either clock signals $F_{out}$ or $F_{ref}$ through an output buffer 44 and onto terminal 26. As will be described, bringing clock signals $F_{ref}$ out onto terminal 26 is necessary since this frequency is one of the parameters used to determine how programmable crystal oscillator 20 must be programmed to generate a specified clock signals $F_{out}$.

In accordance with another feature of the present invention, oscillator 20 further includes a pair of load circuits 46 and 48 that may be programmed, if necessary, to adjust the capacitive loading on crystal 30 and, in turn, pull the clock signal frequency $F_{ref}$ into a range of frequencies conducive to optimal programming of crystal oscillator 20, as explained in applicants' related application cited above. As described in this application, load circuits 46 and 48 each include an array of discrete capacitors that may be programmed into the crystal output circuit in suitable increments, e.g., five picofarads, under the control of programming network 42 over lines 76 and 86, respectively. This capacitance loading adjustment is effective to pull the crystal source frequency up or down, as required, to adjust the reference clock signal frequency to a value appropriate for optimal programming of oscillator 20. Fixed capacitors 75 and 85 provide nominal capacitive loading for crystal wafer 30.

As seen in FIG. 3, frequency multiplier 36 includes a frequency divider 52 that divides the reference clock signal frequency $F_{ref}$ by a programmable parameter Q and applies the resultant clock signal frequency to a phase detector 54 of a phase locked loop (PLL). The phase locked loop also includes a charge pump 56, a loop filter 60 and a voltage controlled oscillator 58, that produces the clock signal frequency $F_{pll}$ going to frequency divider 38 in FIG. 2. This clock signal frequency $F_{pll}$ is also fed back through a frequency divider 64 to a second input of phase detector 54. Divider 64 divides the $F_{pll}$ frequency by a programmable parameter P. Further details of this phase locked loop are provided in applicants' related application.

As described below, the frequency divider parameters Q, P, and N, and, if necessary, adjustments of crystal load circuits 46 and 48, are programmed via programming circuit 42 by programming data entered through Program terminal 22.

Figure 4:
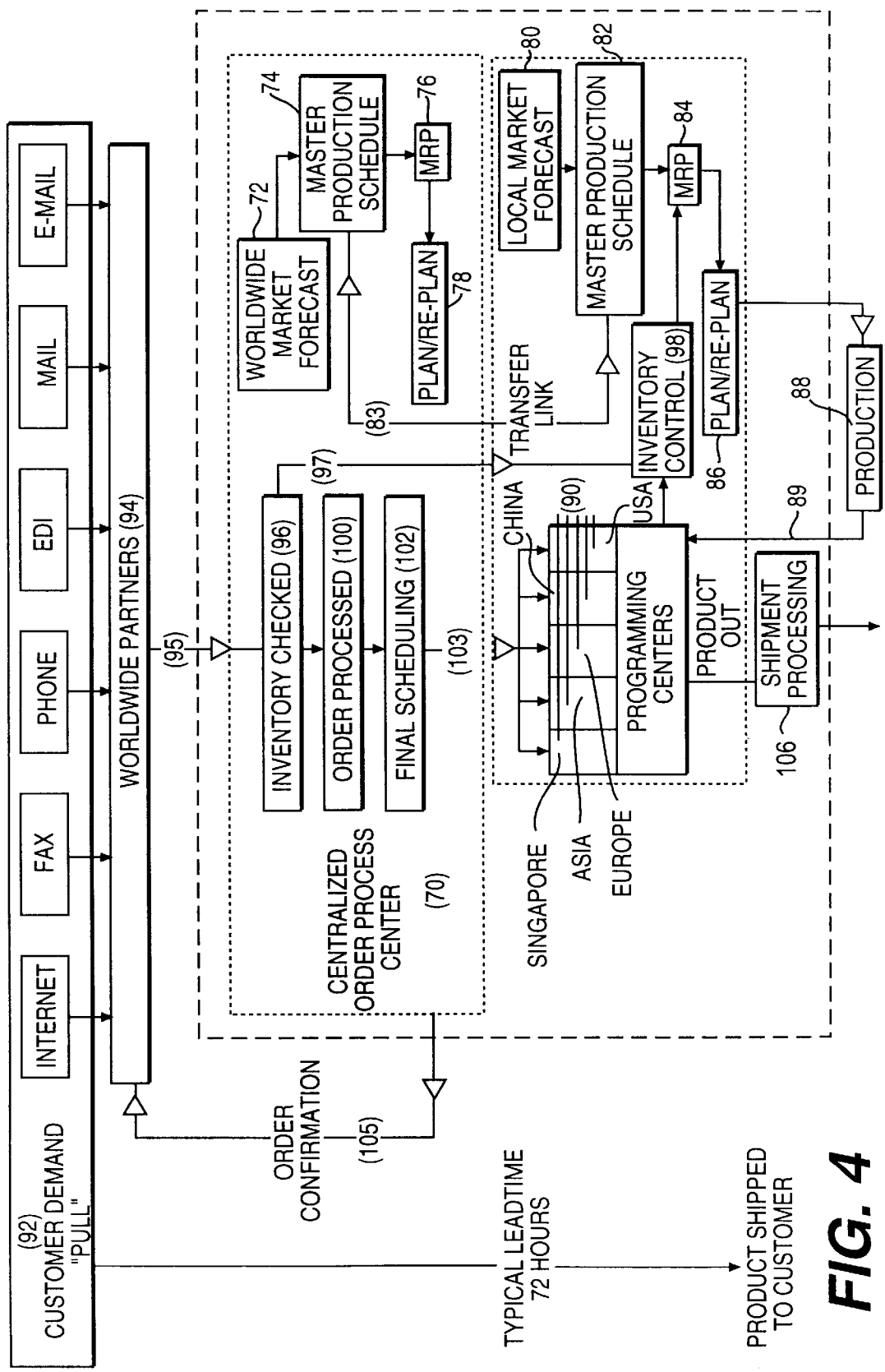
FIG. 4 is a functional block diagram of a worldwide logistics network for marketing the programmable crystal oscillator of FIG. 2.

According to another feature of the present invention, the unique qualities of programmable crystal oscillators 20 lend them to being marketed in accordance with a worldwide logistics network illustrated in FIG. 4. The heart of this network is a centralized order processing center, generally indicated at 70. Activities supporting the order processing center, but not necessarily undertaken at the order processing center site, are worldwide market forecasting 72 of programmable crystal oscillators 20 demands, which, in turn, drives master production scheduling 74 in terms of package sizes and configurations. Master production scheduling drives manufacturing resource planning (MRP) 76, that results in a manufacturing plan 78.

In conjunction with worldwide market forecasting 72, local market forecasting 80 of oscillator demand may also be performed as a basis for master production scheduling 82. As indicated by transfer link 83, the master production schedule 74, based on the worldwide market forecast 72, is rationalized with the master production schedule 82, based on numerous local market forecasts 80, to re-plan the manufacturing plan, which then results in additional manufacturing resource planning (MRP) 84 and a manufacturing plan 86. Since crystal oscillator demand is extremely dynamic, the manufacturing plan is repeatedly revised (replanned).

The production volume of the programmable crystal oscillators 20 in the various package configurations is predicated on the latest manufacturing plan 86, which is communicated to a production facility or to several geographically dispersed facilities 88. The crystal oscillators, finished except for programming, testing, and marking, are shipped, as indicated at 89, to programming centers 90 strategically located to serve market areas throughout the world, as indicated in FIG. 4, in volumes determined by a consensus of the worldwide and local market forecasts. The crystal oscillators 20 are placed in inventories convenient to each of the programming center sites where they await customer orders. It is important to note that crystal oscillator production and inventory levels created at various programming center sites are primarily driven by market forecasting and manufacturing planning, not customer orders.

As further seen in FIG. 4, customers 92 enter crystal oscillator orders into the worldwide logistics network by communicating their orders to agents (sales partners 94) located anywhere in the world, using, for example, any one of the illustrated communications links. The orders are relayed to centralized order processing center 70, again by any available communications link 95. Each customer order is perused as to quantity and package configuration, and the existing inventory levels at the various programming centers 90 are checked 96 by inquiry over a communications link 97 to a common inventory control facility 98. The order processing center can then determine which one of the programming centers is best able to fill the customer order, taking into consideration programming center location relative to customer delivery site and inventory level. For a particularly large volume order, two or more programming centers may be designated to fill the order from existing inventory.

Each order is processed, as indicated at 100, and a final schedule 102 is prepared, taking into further consideration the delivery date specified in the customer order. The schedule is communicated as a work order(s) over a communication link 103 to the one or more programming centers 90 designated to fill the customer order by performing the final steps in the manufacture of each crystal oscillator 20. It will be appreciated that one customer order may specify plural types of oscillators 20 in various quantities, package configurations, signature data, functionalities, and frequencies, etc., with different delivery locations and dates.

The order processing center 70 is equipped to readily accommodate any or all of such variables in a customer order. Once the order processing center determines that the customer orders can be filled in all respects, including delivery dates, confirmations of order acceptance are sent back to agents 94 via communications link 105, who relay the confirmations on to the customers.

Upon completion of final production at a programming center, the crystal oscillators 20 are packed and processed 106 for shipment to the customer-specified delivery destination. The common inventory control facility 98 tracks the inventory levels at the various programming centers 90 and so advises manufacturing resource planning 84. The manufacturing plan 86 is revised to account for inventory depletions on a real time basis, and oscillator production 88 is adjusted accordingly to replenish the programming center inventory to appropriate levels, consistent with up-to-date market forecasts.

By virtue of the worldwide logistics network illustrated in FIG. 4, a typical leadtime from receipt of customer order at the centralized order processing center 70 to customer shipment of programmed oscillators 20 from programming center(s) 90 may be seventy-two hours or less. Currently, leadtimes in the crystal oscillator worldwide marketplace are measured in terms of weeks and months, not hours.

Figure 5:
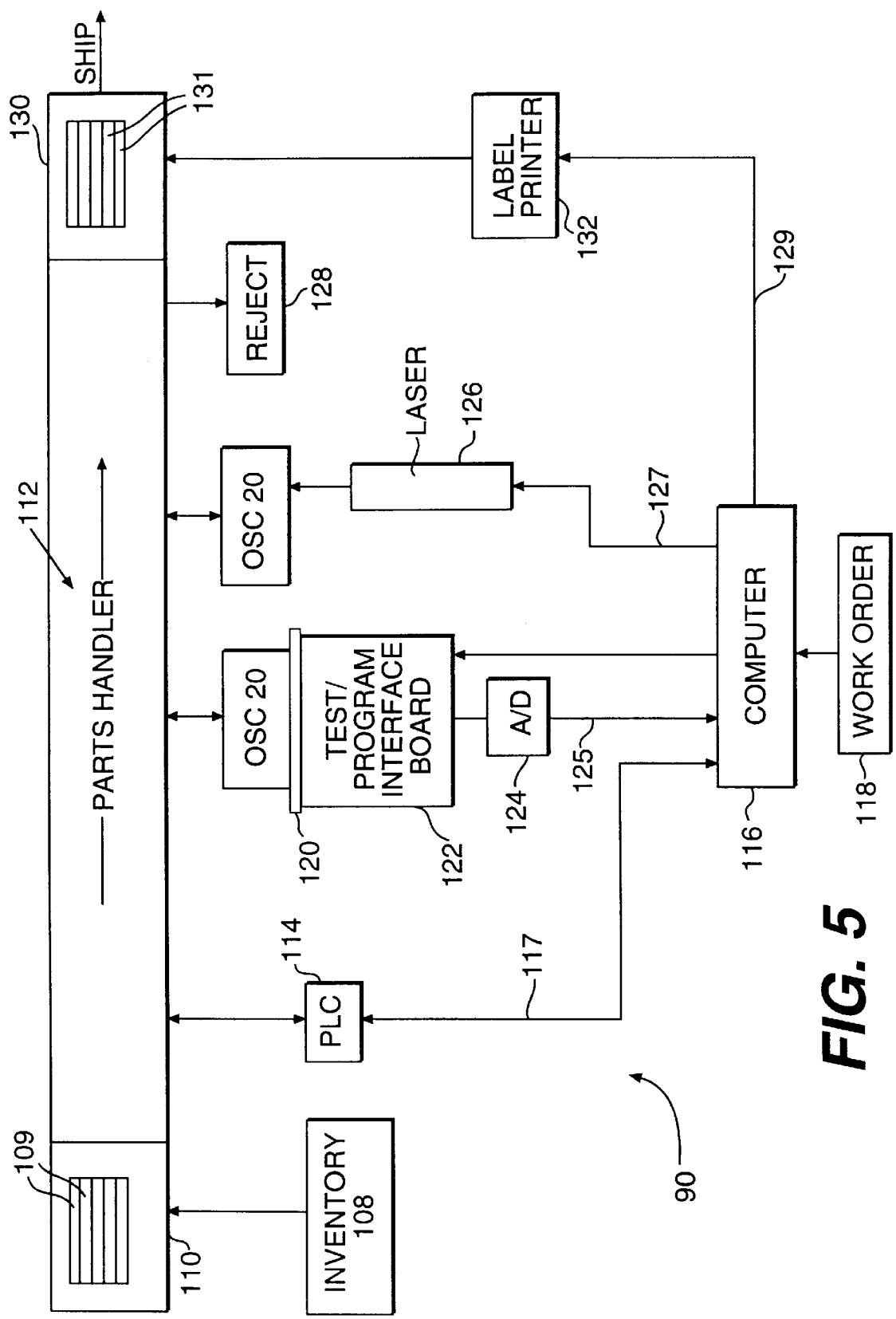
FIG. 5 is a schematic block diagram of one of the programming centers in the network of FIG. 4.

In accordance with a feature of the present invention, each programming center is basically configured in the manner illustrated in FIG. 5. Programmable crystal oscillators 20, packaged in industry standard containers (e.g., ESD tubes and tape reels), as received from the production facility 88 (FIG. 4), are withdrawn from inventory 108 and loaded as batches of containers 109 at an input 110 of a parts handler 112. It will be appreciated that mechanical details of parts handler 112 vary depending upon oscillator size and package configuration. Operational control of the parts handler is performed by a commercially available programmable logic controller (PLC) 114 connected to a commercially available, PC compatible computer 116 by a bus 117. A work order 118, generated from a customer order, is entered into the computer, either directly as communicated from the centralized order processing center 70 in FIG. 4, transcribed by an operator from a work order electronically received from the order processing center and entered manually via a keyboard (not shown), or by a hand held scanner reading a bar-coded work order. To begin filling a work order, computer 116 sends a start signal over bus 117 to PLC 114, as well as the number of oscillators ordered by the customer. In response to the start signal, the PLC initiates operation of parts handler 112 to remove the programmable crystal oscillators 20 from their containers 109, one-by-one, and deliver them successively to a program/test position indicated at 120. Here, the oscillator terminals 21–26 are contacted by terminals of a test/program interface board 122 to power, test, and program each programmable crystal oscillator 20. Interface board 122 may take the form of a test interface board commercially available from PRA, Inc., of Scottsdale, Ariz., that is suitably modified to handle programming inputs to the crystal oscillator, as generated by computer 116. Such an interface board is already designed to handle oscillator test procedures, such as obtaining output frequency, voltage, current, pulse waveform, and duty cycle readings. These readings are converted to digital data by an analog-to-digital (A/D) converter 124 and input over data bus 125 to computer 116 for comparison against customer specifications and for programming purposes described below.

Upon completion of the test and program procedures, each oscillator 20 is marked with identifying indicia, preferably inscription by a laser beam emitted by a laser 126 as controlled by computer 116 over cable 127. Depending upon package configuration, laser marking may be performed without moving the programmed oscillator from program/test position 120 or moved to a separate laser marking position by parts handler 112. If computer 116 determines from the test readings that a particular oscillator fails to meet customer specifications, a fail signal is sent to PLC 114, which then controls parts handler 112 to deposit the failed oscillator in a reject tray 128. If desired, the failed oscillator may be laser marked prior to being deposited in the reject tray.

Oscillators that pass the test procedure progress to an output 130 of the parts handler 112 where they are re-packed in other industry standard containers 131. A count of the oscillators is maintained by the PLC as they are packed. As the containers are filled, computer 116 controls a printer 132 over bus 129 to print appropriate identifying labels, which are applied to the containers 131. The filled containers are packed into shipping cartons (not shown), which are delivered to the customer.

It is seen that each programming center 90 is automated to the extent that it may be manned by a single human operator. The only manual operations involved are loading containers 109 filled with programmable oscillators at the input of the parts handler, loading empty containers 131 at the output end of the parts handler, packing filled containers into shipping cartons, applying labels, and, in some cases, computer entry of work orders.

Figure 6:
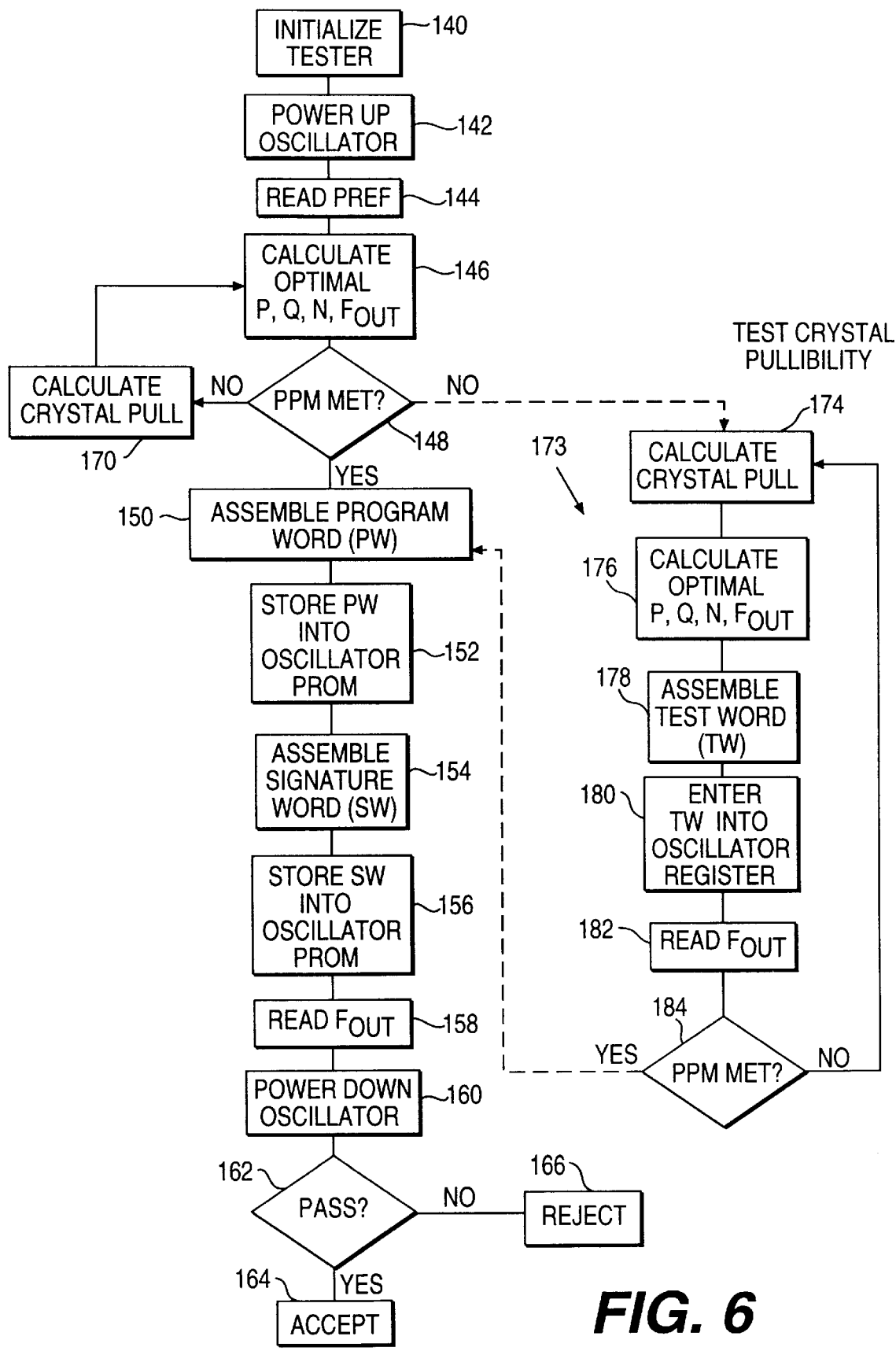
FIG. 6 is a flow chart illustrating a presently preferred method of programming the crystal oscillator of FIG. 2 in the programming center of FIG. 5.

The test/programming procedure performed by a programming center 90 on each programmable crystal oscillator 20 when placed in position 120 by parts handler 112 with its terminal connected into interface board 122 (FIG. 5) is illustrated in the flow charts of FIG. 6. Interface board 122 of FIG. 5 is equipped with a regulated power supply to selectively apply, as controlled by computer 116, an adjustable supply voltage $V_{DD}$ to oscillator terminal 24 and $V_{SS}$ (ground) to oscillator terminal 23, to thus power up the oscillator.

As illustrated in FIG. 6, the test/program procedure is initialized in step 140, and the programmable crystal oscillator 20 electrically connected into interface board 122 is powered up in step 142. Computer 116 conditions multiplexor 40 via the program control logic in program network 42 to route reference clock signals $F_{ref}$ to the $F_{out}/CLK_{in}$ terminal as seen in FIG. 2, and a reading (step 144) of the $F_{ref}$ frequency is taken, converted to digital data by A/D converter 124 and fed to computer 116 (FIG. 5).

In step 146, the computer determines optimal values for the P, Q, and N divider parameters by calculation based on the formula $F_T=F_{ref} \cdot P/(N \cdot Q)$, where $F_T$=customer-specified target frequency, and $F_{ref}$ =reading from step 144.

As indicated in applicants' cited application, it is advantageous that the Q parameter of divider 52 be programmed to achieve a condition where $F_{ref}/Q$ clock signal frequency applied to one input of phase detector 54 in the phase locked loop circuit of FIG. 3 is in the range of 32 KHz–50 KHz (preferably 42.395 KHz–43.059 KHz). This means that the P parameter of divider 64 must be programmed to a value, such that the $F_{pll}/P$ clock signal frequency output by counter 64 to the other input of phase detector 54 is equal to the $F_{ref}/Q$ clock signal frequency to achieve stable phase loop locked circuit operation. However, the programmed P value and the value of N for divider 38 (FIG. 2), are factors in achieving the target frequency specified by the customer, as seen from the above equation.

In accordance with industry practice, every output frequency $F_{out}$ specified by a customer order is stated in terms of a target frequency $F_T$ plus/minus an acceptable accuracy expressed in ppm (parts per million). The industry standard frequency accuracy for crystal oscillators is 100 ppm, which is+0.01% of the target frequency $F_T$.

While the range of each of the programmable parameters Q, P, and N is provided in the dividers to achieve a $F_{ref}/Q$ frequency within the preferred range of 42.395–43.059 KHz and to achieve an $F_{out}$ frequency close to the customer's $F_T$ frequency, the programmed $F_{out}$ signal may not achieve the ppm customer specification, because P, Q and N are typically integers, and the factor P/QN therefore may not yield the specified output frequency accuracy. Thus the objective sought by the computer in step 146 is to determine an optimal combination of P, Q, and N values that meets or beats the customer's ppm specification. Thus, the computer calculates an $F_{out}$ frequency using the determined optimal combination of P, Q, and N values according to the above equation, and then determines in step 148, whether the calculated $F_{out}$ frequency satisfies the customer's ppm specification. If it does (yes), the computer then executes step 150. In this step, programming data bits representing the determined optimal P, Q, and N divider parameters are assembled by the computer into a programming word in step 150. An example of this programming word is illustrated in FIG. 7. This programming word is entered via the Program terminal into the register and stored in the PROM of programming network 42 (FIG. 2) in step 152. This step is accomplished by shifting the programming word into the programming network register via the Program terminal 22 by the application of the appropriate number of shift pulses to the $F_{out}/CLK_{in}$ terminal 26.

Now that the programming word has been entered into the programming network register to complete step 152, it is then non-volatilely stored in the programmable read only memory (PROM) of the program network 42 of FIG. 2. This PROM may take the form of an array of fuses, which are selectively blown under the control of the programming word held in the shift register and the program control logic included in the program network 42. To this end, and in accordance with the current embodiment of the present invention, the Program terminal is held low and the $V_{DD}$ voltage is raised to a high level, while clock pulses are applied to the $F_{out}/CLK_{in}$ terminal. In response to the successive clock pulses, the data bits of the programming word residing in the shift register are serially stored in the PROM either by blowing or not blowing fuses. With the completion of step 152, oscillator 20 should now be programmed to generate clock signals on its terminal $F_{out}/CLK_{in}$ of a frequency conforming to customer specifications of target frequency $F_T$ and ppm.

In the next step 154, customer-specified data is assembled into a signature word. The signature data word includes any information a customer wishes to store in PROM 50 that may be unique to each programmable crystal oscillator 20, such as an auto-incremented ID number, traveler information for trouble-shooting and QC tracking purposes, etc. The assembled signature word is stored (step 156) in the same manner as the frequency programming word in step 152, i.e., entered bit-by-bit into the programming network register via Program terminal 22 by clock pulses $CLK_{in}$ applied to terminal 26 and then clocked out of this register into PROM 50 by an additional string of clock pulses $CLK_{in}$ generated by computer 116.

Now that the programming and signature words have been stored in their respective PROMs, which in practice may be separate areas of a single PROM, the next step is to verify that the now programmed crystal oscillator 20 does generate an output frequency conforming to the customer specified ppm. Multiplexor 40 in FIG. 2 is conditioned to route the output of divider 38 to the $F_{out}/CLK_{in}$ terminal 26, and the programmed frequency of the oscillator output clock signals $F_{out}$ and other parameters are read in step 158. Such other parameters include voltage, current, pulse waveform and duty cycle. Once the output clock signals are read, the programmed crystal oscillator 20 is powered down (step 160). If the computer determines in step 162 that the programmed oscillator clock signal ppm and parameters indeed satisfy customer specifications in all respects, the crystal oscillator 20 is accepted (step 164), whereupon it is laser marked and then packed by parts handler 112 of FIG. 5 into a container 131 at the output end of the parts handler. If not, the oscillator is rejected (step 166), whereupon it is directed to reject tray 128 by the parts handler. As soon as the reading is taken in step 160, the programmed oscillator is replaced by the parts handler with the programmable oscillator next in line.

If step 148 determines the customer's ppm specification is not met by the computer's $F_{out}$ frequency calculation in step 146, it is then necessary to pull the crystal oscillation frequency, (and also the $F_{ref}$ frequency), in the requisite up or down direction by appropriate programming of load circuits 46 and 48 in FIG. 2. To this end, the computer executes step 170, indicated in FIG. 6. According to this step, the computer determines, such as by reference to a lookup table (LUT), what available load circuit adjustment would be effective to pull the $F_{ref}$ frequency (and thus the $F_{ref}/Q$ frequency) to a predicted value that will fine tune $F_{out}$ to a frequency that satisfies the customer's ppm specification. A description of how the programmed adjustments of load circuits 46 and 48 are accomplished is provided in applicants' related application. Step 146 of calculating the P, Q, and N values is then repeated for the pulled (adjusted) $F_{ref}$ frequency prediction, and the recalculated $F_{out}$ frequency is tested in step 148 against the customer's ppm specification. If the specification is now met, the sequence of steps 150, 152, 154, etc., described above, are then executed. However, in step 150, crystal pull programming bits 117 for programming load circuits 46 and 48 are assembled into the programming word illustrated in FIG. 7.

If characteristics of crystal blanks 30 have not been tested beforehand, and thus are of unknown quality, it cannot be predicted what pulling effects programmed adjustments of the crystal load circuits will have on the $F_{ref}$ frequency. In this case, if ppm is not met in step 148, it may be desirable to perform subroutine 173, wherein, step 174 is executed in the same manner as step 170 to determine the extent to which the frequency $F_{ref}$ should be pulled. The computer then calculates in step 176, optimal P, Q, and N parameters based on the predicted $F_{ref}$ frequency, as pulled (adjusted), and assembles a programming test word (step 178) including the data bits of the P, Q, and N values determined in step 176 and the crystal pull data bits determined in step 174. This programming test word is entered in step 180, and the $F_{out}$ frequency is read (step 182) and tested to see whether it meets the customer ppm specification in step 184. If it does, the computer converts the programming test word assembled in step 178 into an assembled programming word in step 150. Steps 152, 154, 156, etc., are then executed, as described above.

If step 184 determines the customer's ppm specification is not met, step 174 is performed again to determine different crystal pull data bits that modify the load circuit adjustment and recalculate optimal P, Q, and N values (step 176). A new programming test word is assembled in 178, entered in step 180, and the $F_{out}$ frequency is read (step 182) and tested against the customer's ppm specification in step 184. This subroutine may be repeated several times until the $F_{out}$ frequency meets customer specification (step 184). Only then is a programming word stored in PROM by complete execution of step 156.

From the foregoing description it is seen that the present invention provides a dramatically improved method for marketing crystal oscillators to customer specification. By virtue of the crystal oscillators being frequency programmable, crystal manufacture can be economized and expedited, since the necessity of processing the crystal wafers to oscillate at specific frequencies is relaxed to the point where they need only oscillate at frequencies with a wide range of frequencies. Thus, manufacturing steps, such as etching, intermediate and fine lappings, and selective plating of the crystal wafers to specified frequencies, testing and sorting, may be reduced in duration, simplified, or even eliminated. In fact, by virtue of the present invention, crystal oscillators, manufactured to customer specification prior to cancellation or delivered to a customer and subsequently unneeded because of market conditions, need not be scrapped completely, since, in many cases, at least the crystals can be re-manufactured into programmable crystal oscillators 20.

In terms of customer benefits, a major advantage of the present invention is the elimination of long leadtime. Customers, faced with long leadtimes, may be forced to spread orders among multiple manufacturers, suffer delays in new product introductions, face inabilities to meet product demand, and/or resort to high inventory buffers at manufacturing sites or customer sites. If new product introductions are delayed or abandoned or forecasted market acceptance fails to materialize, customers may be subjected to contractual penalty charges, supply rescheduling or order cancellations. In contrast, short leadtimes afforded by the present invention allow customers to match their production to actual market demand, take advantage of "just in time" inventory control, and reduce liability to manufacturers for material, work in progress, and finished goods prior to delivery.

It will be readily appreciated by those skilled in the electronics art that, while the foregoing description has been directed to programmable crystal oscillators, the principles of the present invention may be utilized in the manufacture and distribution of other types of electronically programmable devices, such as programmable logic arrays, programmable gate arrays, programmable timing generators, programmable analog arrays, etc. Also, the present invention is clearly applicable to programmable crystal oscillators that are temperature-compensated (TCXOs) and voltage-controlled (VCXOs).

While the present invention has been described in the context of using a standard microprocessor-type crystal blank that oscillates in the range of 5.6396 MHz to 27.3010 MHz, as noted above, it will be understood that the present invention may be achieved using an industry standard watch crystal mass produced to oscillate at 32.768 KHz. In this case, the desired low phase-locked loop frequency may be achieved without the need for frequency divider 52 in frequency multiplier 36 of FIG. 3. Crystal blank 30 would then, in effect, be coupled in direct drive relation with the phase-locked loop circuit. Since watch crystals, by virtue of mass production, are significantly less expensive than microprocessor-type crystals, further economies in the production of programmable crystal oscillators in accordance with the present invention may be achieved.

It will be apparent to those skilled in the art that various modifications and variations may be made to the worldwide marketing logistics network of the present invention without departing from the spirit of the invention. Thus, it is intended that the scope of the present invention cover modifications and variations thereof, provided they come within the spirit of the appended claims and thus equivalents.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of manufacturing and distributing programmable crystal oscillators in response to customer demand, comprising the steps of:

manufacturing a supply of generic programmable crystal oscillators at a production site;

distributing the supply of generic programmable crystal oscillators amongst a plurality of crystal oscillator programming centers at geographically diverse sites linked to a centralized order process center by a communications network to maintain an inventory of generic programmable crystal oscillators at each programming center;

accepting at the order process center customer orders for crystal oscillators;

processing each customer order at the order process center to identify specifications of each processed customer order, the specifications including oscillator quantity and output frequency, and delivery date and destination;

communicating the customer orders as work orders over the communications network from the order process center to selected programming centers based on capability to meet the customer order specifications; and each programming center, in response to receipt of a work order, performing the steps of:

withdrawing from inventory a quantity of generic programmable crystal oscillators sufficient to satisfy the oscillator quantity specified in the received work order;

programming each generic programmable crystal oscillator to generate the output frequency specified by the received work order; and shipping the programmed crystal oscillators to the delivery destination specified by the received work order.

2. The method defined in claim 1, further comprising the steps of:

communicating between the order process center and the programming centers to determine inventory levels at each programing center site;

initiating by the order process center manufacture of a resupply of the generic crystal programmable oscillators; and shipping the generic programmable crystal oscillator resupply to the programming center sites in quantities to restore the inventory levels thereat.

3. The method defined in claim 2, wherein the customer order processing step further includes the steps of:

developing schedules of work order executions by the programming centers; and communicating the schedules to the programming centers such that the received work orders are executed at each programming center in a sequence appropriate to meet the delivery dates specified by the received work orders.

4. The method defined in claim 3, further comprising the steps of:

forecasting customer demand for crystal oscillators;

scheduling generic programmable oscillator manufacture at the production site in anticipation of the forecasted crystal oscillator demand; and adjusting the inventory levels of the generic programmable oscillators at each of the programming center sites in anticipation of the forecasted crystal oscillator demand.

5. The method defined in claim 1, wherein the programming centers perform the further steps of:

powering up each generic programmable crystal oscillator; and reading a reference frequency output by each powered up generic programmable crystal oscillator, wherein the programming step is uniquely performed on a basis of the reference frequency reading to program the generic programmable crystal oscillator to generate the output frequency specified by the received work order.

6. The method defined in claim 5, wherein the programming centers perform the further steps of:

testing each programmed crystal oscillator to determine an output frequency of a signal generated thereby; and rejecting the programmed oscillators when the output frequency fails to meet the output frequency specified by the received work order.

7. The method defined in claim 6, wherein the testing step further includes evaluating characteristics of the generated signal, such characteristics including, in addition to output frequency, at least one of pulse waveform, duty cycle, current and voltage.

8. The method defined in claim 6, wherein the programming centers perform the further step of marking each programmed oscillator with identifying indicia.

9. The method defined in claim 8, wherein the marking step includes scribing the indicia on each programmed oscillator using a laser beam.

10. The method defined in claim 9, wherein the steps performed by the programming centers are executed in an automated manner.

11. The method defined in claim 9, further comprising the steps of:

storing the inventoried generic programmable crystal oscillators at each programming center site in serial order within first containers as received from the production site;

loading a plurality of the first containers at an input to a work cell;

loading a plurality of empty second containers at an output of the work cell;

automatically feeding the generic programmable oscillators serially from the first containers to one or more positions in the work cell where the steps performed by the programming centers are executed; and automatically feeding the programmed oscillators serially into the second containers for shipping to the delivery destination.

12. The method defined in claim 11, wherein the programming centers perform the further step of printing labels for application to each second container.

13. The method defined in claim 5, wherein the programming centers perform the further step of storing in each programmed oscillator customer data specified in the received work orders.

14. A method of manufacturing programable crystal oscillators to diverse customer specifications, comprising the steps of:

produ cing a supply of programmable crystal oscillators;

maintaining an inventory of the programmable crystal oscillators;

withdrawing from the inventory a plurality of the programmable crystal oscillators sufficient to satisfy a quantity of crystal oscillators specified in a customer order;

powering up each of the plurality of programmable crystal oscillators;

reading a reference frequency output by each powered-up programmable crystal oscillator; and programming each programmable crystal oscillator on the basis of the reference frequency reading to produce programmed crystal oscillators that output a clock signal frequency specified by the customer order.

15. The method defined in claim 14, further comprising the step of testing each programmed crystal oscillator to verify that the clock signal frequency thereof conforms to the specified frequency.

16. The method defined in claim 15, further comprising the step of evaluating one or more characteristics of the clock signal frequency outputted by each programmed crystal oscillator, the characteristics including at least one of signal waveform, pulse duty cycle, current and voltage.

17. The method defined in claim 15, further comprising the step of storing retrievable customer data in each programmed crystal oscillator.

18. The method defined in claim 15, further including the step of marking each programmed crystal oscillator with identifying indicia.

19. The method defined in claim 18, wherein the marking step includes scribing the indicia on each programmed crystal oscillator using a laser beam.

20. The method defined in claim 14, wherein the programmable crystal oscillators respectively include crystals that generate reference clock signals of randomly differing frequencies, respective first dividers for dividing the reference clock signal frequencies by programmable parameters Q, respective phase locked loops including inputs connected to the first dividers and second dividers for dividing loop frequencies by programmable parameters P, and respective third dividers for dividing phase locked loop output frequencies by programmable parameters N to produce the clock signal frequency, the programming step for each programmable crystal oscillator including the steps of:

calculating a set of values for the Q, P, and N parameters based on an equation $F_T = F_{ref} P/(Q \cdot N)$, where $F_T$=the customer-specified clock signal frequency, and $F_{ref}$ the read reference frequency;

assembling programming data including the set of calculated Q, P, and N parameters; and storing the programming data in the programmable crystal oscillator to program the first, second, and third dividers to divide by the calculated Q, P, and N parameters.

21. The method defined in claim 20, wherein the calculating step calculates the set of the Q, P, and N values, such that: $32 \text{ KHz} \leq F_{ref}/Q \leq 50 \text{ KHz}$; and $F_{out}$=a frequency closest to a target frequency specified by the customer.

22. The method defined in claim 21, wherein each programmable crystal oscillator further includes a programmable load circuit for adjusting the reference frequency, and wherein the method further comprises the steps of:

determining, based on a reference frequency value obtained in the reading step, data bits appropriate for programming the load circuit to achieve an adjusted reference clock signal frequency value that enables fine tuning $F_{out}$ to within an accuracy range of the target frequency specified by the customer, and storing the data bits in the programmable crystal oscillator to program the load circuit.

23. A method of programming crystal oscillators, each including a crystal that generates a reference frequency within an acceptable frequency range and a plurality of programmable frequency dividers electrically coupled to the crystal for arithmetically operating on the reference frequency to produce an output frequency within a specified frequency range, the method comprising, with respect to each crystal oscillator, the steps of:

reading the reference frequency;

determining a combination of respective divisor parameters for the frequency dividers based on the reference frequency reading;

calculating the output frequency based on the reference frequency reading and the determined divisor parameter combination;

comparing the calculated output frequency to the specified frequency range;

storing the determined divisor parameter combination in the crystal oscillator, if the calculated output frequency falls within the specified frequency range, whereby to program the frequency dividers such that the crystal oscillator will generate an output frequency within the specified range.

24. The method defined in claim 23, further including the step of reading the generated output frequency to verify that it falls within the specified frequency range.

25. The method defined in claim 23, wherein each crystal oscillator includes a programmable crystal load circuit for adjusting the reference frequency, the method further comprising the steps of:

determining a load circuit parameter that will produce an adjusted reference frequency, if the calculated output frequency falls outside the specified frequency range;

recalculating the output frequency based on the adjusted reference frequency and the determined divisor parameter combination; and recomparing the recalculated output frequency to the specified frequency range, wherein the storing step includes storing the determined load circuit parameter together with the determined divisor parameter combination in the crystal oscillator, whereby to also program the load circuit to product the adjusted reference frequency.

26. The method defined in claim 25, further including the step of reading the generated output frequency to verify that it falls within the specified frequency range.

27. The method defined in claim 25, further including the step of determining a different combination of respective divisor parameters based on the adjusted reference frequency, wherein, the recalculating step is performed on the basis of the adjusted reference frequency and the determined different divisor parameter combination.

28. A method of programming crystal oscillators, each including a crystal that generates a reference frequency within an acceptable frequency range and a plurality of programmable frequency dividers electrically connected in circuit with the oscillator to perform arithmetic operations based on the reference frequency to program the oscillator to generate an output frequency within a specified frequency range, the method comprising, with respect to each crystal oscillator, the steps of:

reading the reference frequency;

determining, based on the reference frequency reading, a combination of respective divisor parameters for the frequency dividers;

storing the determined divisor parameter combination in the crystal oscillator to program the frequency dividers, such that the crystal oscillator generates an output frequency;

reading the generated output frequency; and comparing the output frequency reading to the specified frequency range.

29. The method defined in claim 28, further including the steps of:

determining a parameter of a programmable load circuit connected to the crystal for adjusting the reference frequency, if the output frequency reading falls outside the specified frequency range;

storing the determined load circuit parameter and the determined divisor parameter combination in the crystal oscillator.

30. The method defined in claim 29, wherein, if the new output frequency falls outside the specified frequency range, the method further comprises the steps of:

redetermining a different load circuit parameter for readjusting the reference frequency;

redetermining a different combination of respective divisor parameters;

re-entering the redetermined different load circuit parameter and redetermined different combination of divisor parameters into a register to temporarily program the load circuit and frequency dividers accordingly, such that the crystal oscillator generates and adjusted new output frequency, reading the adjusted new output frequency;

recomparing the adjusted new output frequency to the specified frequency range; and reiterating the redetermining, re-entering, rereading, and recomparing steps in sequence a limited number of times until a generated output frequency falls within the specified frequency range before permanently programming the load circuit and the frequency dividers.

31. The method defined in claim 28, wherein the determining step calculates values for the combination of divisor parameters that would generate the output frequency within the specified frequency range and a division of the read reference frequency applied to a phase locked loop in the crystal oscillator that falls within a narrow, low frequency range conducive to stabilize phase locked loop operation.

32. A network for distributing programable crystal oscillators in response to customer demand, comprising:

a centralized order process center for receiving customer orders for crystal oscillators, each customer order specifying a quantity of crystal oscillators and an output frequency within an acceptable range; and at least one programming center for receiving customer orders over a communications link, the programming center including:

an inventory of programmable crystal oscillators, a parts handler for serially feeding the programmable crystal oscillators taken from inventory into a test/program position, a computer electrically connectable to each programmable crystal oscillator while residing in the test/program position for receiving a reading of a variable reference frequency generated by each connected programmable crystal oscillator, the computer being programmed to compute unique frequency divider parameters, based on each reference frequency reading, effective to program each connected programmable crystal oscillator to generate an output frequency within the specified frequency range, enter the computed frequency divider parameters into a program memory in each connected programmable crystal oscillator to produce programmed crystal oscillators, and test an output frequency generated by each programmed crystal oscillator to verify that the tested output frequency falls within the specified frequency range.

33. The network defined in claim 32, wherein the programming center further includes means controlled by the computer for marking each programmed crystal oscillator with identifying indicia.

34. The network defined in claim 32, further including a plurality of geographically dispersed programming centers.

35. The network defined in claim 33, wherein the programming center further includes a printer for printing labels for application to containers filled with programmed crystal oscillators.

36. The network defined in claim 32, wherein the computer is further programmed to determine a parameter for a programmable crystal load circuit effective to adjust the reference frequency in a manner to pull the output frequency to within the specified frequency range, and enter the determined load circuit parameter into the program memory to program the load circuit to achieve the adjusted reference frequency.

37. The network defined in claim 32, wherein the computer, upon receipt of customer data, enters the customer data into a register in each programmed crystal oscillator prior to removal from the test/program position by the parts handler.

38. A programming center for programming crystal oscillators to generate an output frequency within a specified frequency range, comprising:

an inventory of programmable crystal oscillators, a parts handler for serially feeding the crystal oscillators taken into a test/program position, a computer electrically connectable to each crystal oscillator while residing in the test/program position for receiving a reading of a variable reference frequency generated by each connected crystal oscillator, the computer being programmed to determine unique frequency divider parameters, based on each reference frequency reading, in order to program each connected crystal oscillator to generate an output frequency within the specified frequency range, enter the computed frequency divider parameters into a program memory in each connected crystal oscillator to produce programmed crystal oscillators, and test an output frequency generated by each programmed crystal oscillator to verify that the tested output frequency falls within the specified frequency range.

39. The programming center defined in claim 38, further includes means controlled by the computer for marking each programmed crystal oscillator with identifying indicia.

40. The programming center defined in claim 39, further includes a printer for printing labels for application to shipping containers filled with programmed crystal oscillators.

41. The programming center defined in claim 38, wherein the computer is further programmed to determine a parameter for a programmable crystal load circuit in each crystal oscillator in order to pull the reference frequency in a manner to adjust the output frequency to within the specified frequency range, and enter the determined load circuit parameter into the program memory to program the load circuit, such as to achieve the pulled reference frequency.

42. The programming center defined in claim 38, wherein the computer, upon receipt of customer data, enters the customer data into a register in each programmed crystal oscillator prior to removal from the test/program position by the parts handler.

43. The programming center defined in claim 38, wherein the crystal oscillators respectively include crystals that generate the reference frequencies of randomly differing frequencies, respective first dividers for dividing the reference frequencies by programmable parameters Q, respective phase locked loops including inputs connected to the first dividers and second dividers for dividing loop frequencies by programmable parameters P, and respective third dividers for dividing phase locked loop output frequencies by programmable parameters N to produce the output frequencies, wherein:

the computer determines the frequency divider parameters by calculating a set of values for the Q, P, and N parameters based on an equation $$F_{out}=F_{ref}P/(Q \cdot N), \text{ where}$$

$F_{out}$=the customer-specified clock signal frequency, and $F_{ref}$ the read reference clock signal frequency, assembles programming data including the set of calculated Q, P, and N parameters; and stores the programming data in the program memory to program the first, second, and third dividers to divide by the calculated Q, P, and N parameters.

44. The programming center defined in claim 43, wherein the computer calculates the set of the Q, P, and N values, such that: 30 KHz$\leq F_{ref}/Q \leq$52 KHz; and $F_{out}$=a frequency closest to a target frequency within the frequency range specified by the customer.

45. The programming center defined in claim 43, wherein each crystal oscillator further includes a programmable load circuit for adjusting the reference clock signal frequency, and wherein the computer determines, based on the read reference frequency, data bits appropriate for programming the load circuit to achieve an adjusted reference clock signal frequency value that enables fine tuning $F_{out}$ into the specified frequency range, and stores the data bits in the program memory to program the load circuit.

46. A method of manufacturing and distributing electronically programmable devices in response to customer demand, comprising the steps of:

manufacturing a supply of the programmable devices at a production site;

distributing the supply of the programmable devices amongst a plurality of programming centers at geographically diverse sites linked to a centralized order process center by a communications network to maintain an inventory of the programmable devices at each programming center;

accepting at the order process center customer orders for programmed devices;

processing each customer order at the order process center to identify specifications of each processed customer order, the specifications including programming data, and delivery date and destination;

communicating the customer orders as work orders over the communications network from the order process center to selected programming centers based on capability to meet the customer order specifications; and each programming center, in response to receipt of a work order, performing the steps of:

withdrawing from inventory a quantity of programmable devices sufficient to satisfy the device quantity specified in the received work order;

electronically programming each programmable device in accordance with the programming data specified in the received work order; and shipping the programmed devices to the delivery destination specified by the received work order.

\* \* \* \* \*